July 6, 1943.  C. C. CALKINS ET AL  2,323,452
ROTARY ROD WEEDER
Filed Oct. 11, 1941  2 Sheets-Sheet 1

Inventors:
Claude C. Calkins
and Laurence A. Hunt,
By Soans, Pond & Anderson
Attorneys.

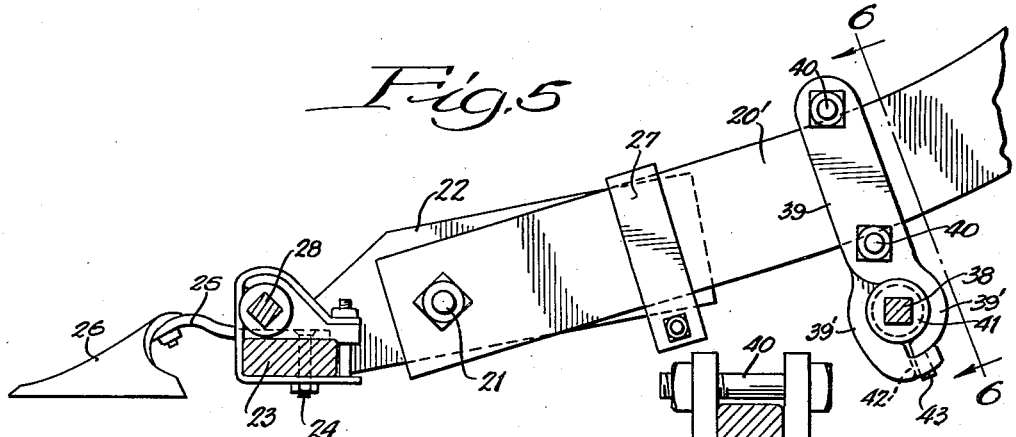
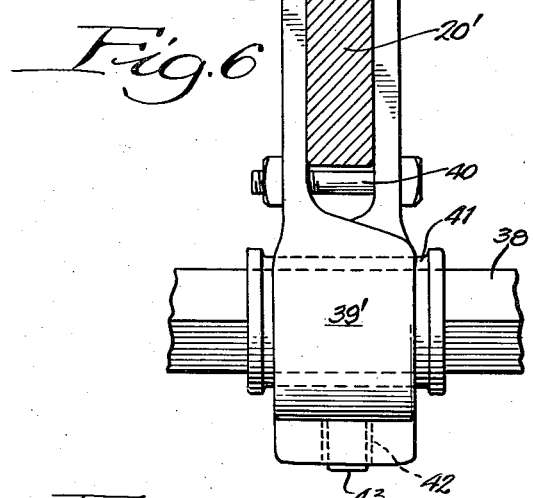
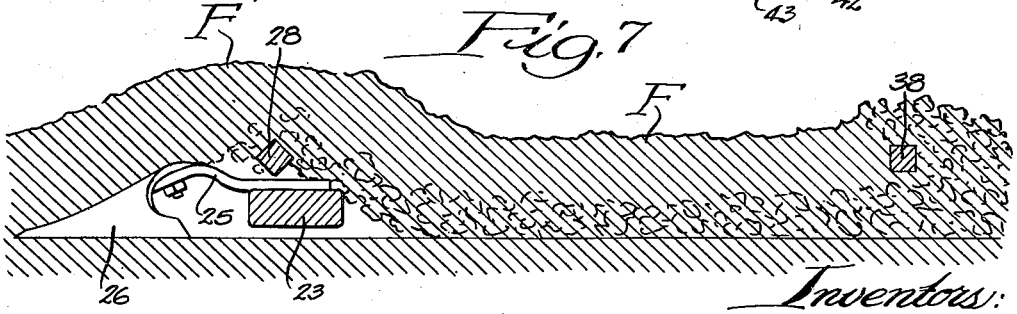

Patented July 6, 1943

2,323,452

UNITED STATES PATENT OFFICE 2,323,452

ROTARY ROD WEEDER

Claude C. Calkins and Laurence A. Hunt, Spokane, Wash., assignors to Calkins Manufacturing Company, a corporation of Washington Application October 11, 1941, Serial No. 414,568

11 Claims. (Cl. 97—42)

This invention relates to weeders of the general type disclosed in patents of Claude C. Calkins, No. 1,818,532, August 11, 1931, and No. 1,910,881, May 23, 1933, wherein the weeding tool consists of a rod of square cross-section journaled in the lower ends of a gang of parallel longitudinal gooseneck beams and rotating in a backward direction relative to the direction of travel of the machine beneath the surface of the ground, to uproot and throw backward weeds, grain stubble, and the like.

In later applications of Claude C. Calkins, Serial No. 364,007, filed November 2, 1940, and Serial No. 385,236, filed March 26, 1941, now Patent No. 2,299,522, October 20, 1942, and in our application Serial No. 395,986, filed May 31, 1941, now Patent No. 2,282,560, May 12, 1942, there are disclosed improvements on the weeders of the aforesaid Calkins patents, consisting mainly of a bar mounted on and crosswise of bracket plates attached to the forward ends of the goosenecks, and a gang of closely adjacent shovels is employed for breaking up the ground in advance of the rotary weeder rod, said shovels being mounted on shanks which are bolted to said bar. In applications Serial Nos. 364,007 and 385,236 the weeder rod is located between the bar and the gang of shovels, and in application Serial No. 395,986 the weeder rod is mounted parallel with and above the bar.

In practical experience with rotary rod weeders, whether employing a gang of shovels in advance of the weeder or tiller rod or not, we have found that where the weeder rod goes deep enough to thoroughly loosen up the soil it does not sufficiently disturb the surface of the ground, so that it is necessary in many cases to go over the ground again and cultivate somewhat shallower than before, coming close enough to the top of the ground to rip the weeds, the roots of which have been dislodged, out of the soil and thus kill them.

To avoid the double treatment, we have, in accordance with the present invention, added a second rotary weeder rod to the machine, behind and preferably parallel with the main weeder rod, locating it far enough behind that the soil as it passes over the front weeder rod (and the bar to which the shovels are attached, if shovels are used) has a chance to settle back again, and the rear or second weeder rod then works through this deposited layer of soil and throws out and kills the weeds uprooted by the first weeder bar. This second weeder bar is preferably journaled in bearings that are adjustably mounted on the goosenecks so that they can be shifted forwardly or rearwardly to vary the distance from the front or main weeder bar, and since the goosenecks are curved downwardly and forwardly, the distance at which the rear weeder rod operates from the surface of the ground can be adjusted at the same time.

A practical embodiment of the invention is illustrated in the accompanying drawings, in which—

Fig. 5 is an enlarged fragmentary side elevation, in section through the weeder rods and the shovel-supporting bar, showing the adjustable clamp on the gooseneck in which the rear weeder bar is journaled;

Fig. 6 is a further enlarged section taken on the line 6—6 of Fig. 5; and

Fig. 7 is a cross-section, roughly illustrating the operation of the shovels and weeder rods on the top film of earth and the weeds and grain stubble therein.

Figure 1:
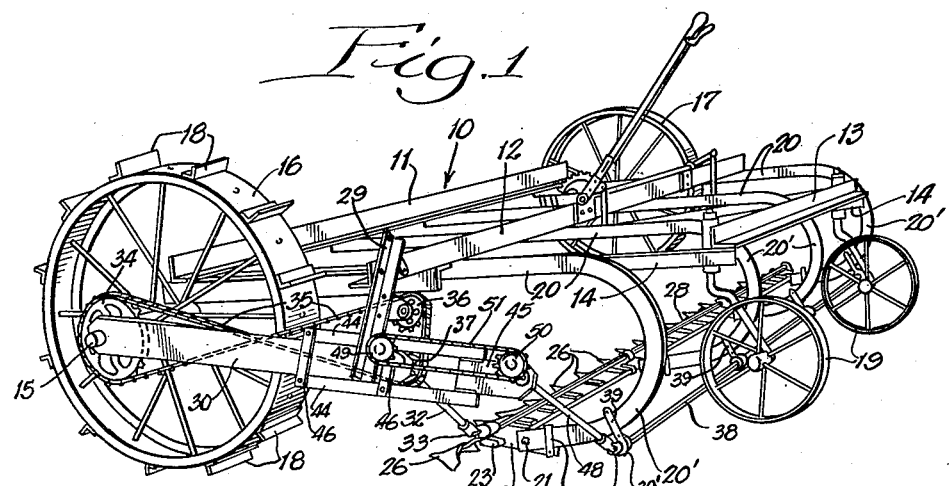
Fig. 1 is a perspective view of a rod weeder equipped with my present improvement.
Figure 2:
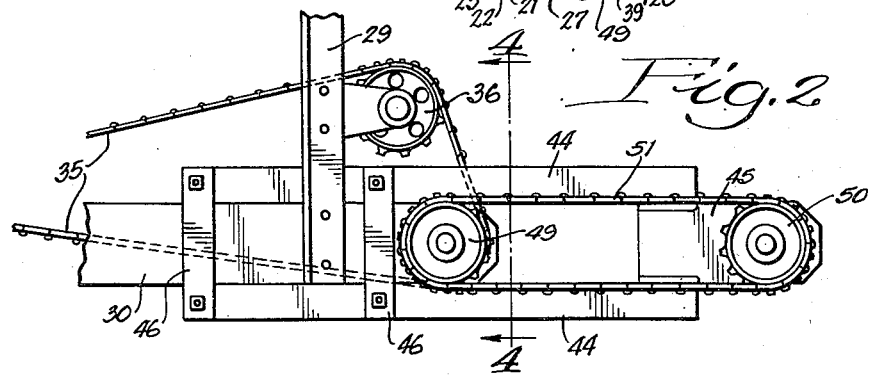
Fig. 2 is a fragmentary enlarged side elevation of the drive for the two weeder rods.

In the drawings we have shown the present improvements applied to a rod weeder employing a gang of closely adjacent shovels in advance of the rotary weeder rod, but we wish it to be understood that said improvements are applicable to advantage to the earlier types of machines which do not have the shovels.

Referring to the drawings, in Fig. 1 we have shown in perspective a rod weeding machine to which our present improvements are applied, said machine as to its frame structure and traction devices closely following those shown and described in the patents and applications above identified, and including a frame structure designated as an entirety by 10 and including transverse angle bars 11, 12 and 13 and longitudinal angle bars 14. In the front of the frame is journaled a front axle 15, loose on which are a pair of wheels 16 and 17, the former equipped with cleats 18 to afford traction for driving the two rotary weeder rods later described. The rear end of the frame is supported by a pair of steering wheels 19. In the frame is mounted a gang of rearwardly extending parallel longitudinal beams 20 that terminate at their rear ends in depending gooseneck portions 20'.

Vertically mounted, as by a pivot bolt 21 (Fig. 5) on the forward end of each gooseneck 20' is a bracket plate 22, rigid with the forward end of which is a horizontally oblong collar (not herein shown); and supported in the collars of the several bracket plates is a bar 23 which lies crosswise of the goosenecks 20' and is locked to the collars by set screws or otherwise; and attached to the bar 23 as by bolts 24 (Fig. 5) are the shanks 25 of a plurality of closely adjacent shovel plates 26. By means of an adjustable clamp 27 partly shown in Fig. 5, the bracket plate 22 may be tilted on its pivot bolt 21 to vary the angle and depth of penetration of the shovels 26.

The above described parts carried by the forward end portions of the goosenecks 20' are borrowed from and fully described in the above mentioned applications Serial Nos. 385,236 and 395,986.

Figure 3:
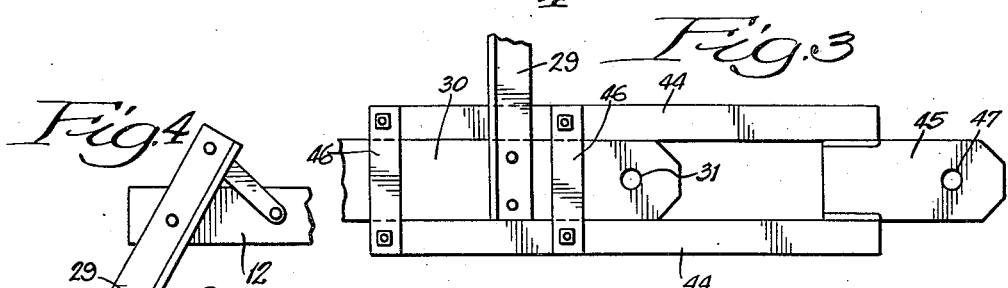
Fig. 3 is a view similar to Fig. 2, omitting the sprockets and chains, and better showing the means for adjusting the location of the sprocket that drives the rear weeder rod.
Figure 4:
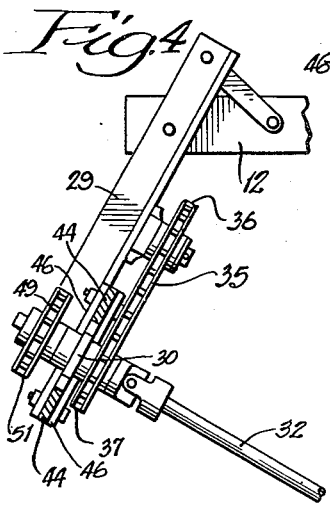
Fig. 4 is a vertical section taken on the line 4—4 of Fig. 2.

Journaled directly above and parallel with the bar 23 by means disclosed and claimed in the aforesaid application Serial No. 395,986 is the front weeder rod 28. The drive of this weeder rod from the wheel 16 is identical with that shown in applications Serial Nos. 364,007, 385,236, and 395,986, and consists of the following parts:

Mounted on one end of the axle 15 and the lower end of a depending angle bar 29 secured to the cross-bar 12 is a fixed warped bar 30 formed in its rear end with a bearing 31 (Fig. 3) for an angle shaft 32 that is coupled, by a universal joint 33, to one end of the weeder rod 28. Fast on the hub of wheel 16 is a sprocket 34 driving a crossed chain 35 that passes over an idler sprocket 36 mounted on the bar 29 and around a driven sprocket 37 fast on shaft 32.

Coming now to a description of the present improvements, 38 designates an auxiliary weeder rod that is, or may be, a duplicate of the rod 28, and is disposed a greater or less distance to the rear of, and parallel with, the rod 28. It is preferably supported by the goosenecks 20' by the means best shown in Figs. 5 and 6.

This means comprises a series of clamps, preferably comprising a pair of bars 39 that straddle the gooseneck 20' and are clamped thereon by bolts 40. The lower ends of the bars 39 are formed as mating semi-circular extensions 39' that together form a bearing for a spool or bushing 41 through which the weeder rod 38 extends. The lower end of one of the extensions 39' is formed with a hole 42, and the other with a lug 43 entering the hole by which the two clamp bars are accurately centered on the sides of the gooseneck to receive the spool 41 and the bolts 40. Obviously, by simply loosening the bolts 40 the clamps may be adjusted lengthwise of the goosenecks so as to locate the auxiliary weeder rod 38 at a greater or less distance from the main weeder rod 28. The same adjustment also varies the height of the rod 38 relatively to that of the rod 28, so that the auxiliary rod may operate closer to or further from the surface of the ground. A simple and convenient drive for the auxiliary rod 38 from the angle shaft 32 of the main rod 28 is shown in Figs. 1, 2, 3 and 4. Slidable on the upper and lower edges of the bar 30 is an extension bar comprising upper and lower strips 44, between the outer ends of which is welded a short plate 45. This extension bar is clamped in any adjusted position on the main supporting bar 30 by a pair of clamps 46 structurally similar to the clamps 39. In the outer end of the short bar 45 is a bearing 47 for the upper end of an angle shaft 48 that is structurally and functionally identical with the angle shaft 32, the lower end of shaft 48 being coupled by a universal joint 49 on one end of the weeder rod 38. The rod 38 is driven in the same direction as the rod 28 by sprockets 49 and 50 on the respective shafts 32 and 48, and a connecting chain 51. Obviously, when adjusting the rear weeder rod 38 toward or from the front rod 28, one or more links will be subtracted from or added to the sprocket chain 51.

Fig. 7 roughly illustrates the action of the two weeder rods 28 and 38 on a film or layer of weed-carrying earth F that is cut and raised by the gang of shovels 26. This layer is elevated over the shovels 26 and the bar 23 as shown at F', during which time the front or main weeder rod 28 loosens and uproots the weeds, but it does not throw the weeds, for the most part, clear of the surface of the film. As the raised film settles back, it encounters the rear auxiliary weeder rod 38 which catches the stems of the weeds higher up than does the rod 28, and for the most part throws the weeds rearwardly out of the surface film, thus destroying them. As compared with former machines having but a single rotary weeder rod, this machine, whether equipped with shovels or not, saves the necessity of going over the ground twice in order to throw out and kill the weeds.

It is to be understood that the present improvement is equally applicable, with the same beneficial effect, to machines, such as are shown in the above referred to applications Serial Nos. 364,007 and 385,236, wherein the weeder rod lies between the shovel-supporting bar and the shovels, as well as to machines having no shovels.

Variations and modifications in the structural details may be resorted to within the scope and coverage of the appended claims.

We claim:

1. In a weeder of the class described having a gang of longitudinal beams terminating at their rear ends in depending portions, the combination of a pair of weeder rods rotatably supported, one behind the other, crosswise of all of said depending portions, and means for simultaneously rotating said weeder rods.

2. In a weeder of the class described having a gang of longitudinal beams terminating at their rear ends in depending portions, the combination of a pair of weeder rods rotatably supported, one behind, parallel with, and nearer the surface of the ground than, the other, from and crosswise of said depending portions, and means for simultaneously rotating said weeder rods in the same direction.

3. In a weeder of the class described having a gang of longitudinal beams terminating at their rear ends in depending portions, the combination of a group of laterally adjacent shovels mounted on and crosswise of the lower ends of said depending portions, a pair of weeder rods rotatably supported from and crosswise of all of said depending portions at different distances behind said group of shovels, and means for simultaneously rotating said weeder rods.

4. In a weeder of the class described having a gang of longitudinal beams terminating at their rear ends in depending goosenecks, the combination of a front weeder rod rotatably supported crosswise of and in front of said goosenecks, a rear weeder rod parallel with said front rod, means adjustable along said goosenecks supporting and journaling said rear weeder rod, and means for simultaneously rotating both of said weeder rods in a direction to first uproot weeds and then throw them rearwardly of the machine.

5. In a weeder of the class described having a gang of longitudinal beams terminating at their rear ends in depending goosenecks, the combination of a group of laterally adjacent shovels mounted on and crosswise of the lower ends of said goosenecks, a front weeder rod rotatably supported from and crosswise of said goosenecks behind said group of shovels, a rear weeder rod parallel with said front rod, means adjustable along said goose-necks supporting and journaling said rear weeder rod, and means for simultaneously rotating both of said weeder rods in a direction to first uproot weeds and then throw them rearwardly of the machine.

6. In a weeder of the class described having a gang of longitudinal beams terminating at their rear ends in depending goosenecks, the combination of a front weeder rod rotatably supported crosswise of the lower ends of said goosenecks, means for driving said front weeder rod, a rear weeder rod rotatably supported from and crosswise of said goosenecks parallel with said front rod, and means for driving said rear rod from the driving means of said front rod.

7. In a weeder of the class described having a gang of longitudinal beams terminating at their rear ends in depending goosenecks, the combination of a group of laterally adjacent shovels mounted on and crosswise of the lower ends of said goosenecks, a front weeder rod rotatably supported from and crosswise of said goosenecks behind said group of shovels, means for driving said front weeder rod, a rear weeder rod rotatably supported from and crosswise of said goosenecks parallel with said front rod, and means for driving said rear rod from the driving means of said front rod.

8. In a weeder of the class described having a gang of longitudinal beams terminating at their rear ends in depending goosenecks, the combination of a front weeder rod rotatably supported crosswise of the lower ends of said goosenecks, a chain and sprocket drive for rotating said front weeder rod, a rear weeder rod rotatably supported from and crosswise of said goosenecks parallel with said front rod, and a chain and sprocket drive for rotating said rear rod from the chain and sprocket drive of said front rod.

9. In a weeder of the class described having a gang of longitudinal beams terminating at their rear ends in depending goosenecks, the combination of a group of laterally adjacent shovels mounted on and crosswise of the lower ends of said goosenecks, a front weeder rod rotatably supported from and crosswise of said goosenecks behind said group of shovels, a chain and sprocket drive for rotating said front weeder rod, a rear weeder rod rotatably supported from and crosswise of said goosenecks parallel with said front rod, and a chain and sprocket drive for rotating said rear rod from the chain and sprocket drive of said front rod.

10. An embodiment of claim 4 wherein the means adjustable along the goosenecks supporting and journaling the rear weeder rod consists of clamps embracing the goosenecks and formed on their lower ends with bearings in which the rear weeder rod is journaled.

11. An embodiment of claim 8 wherein the drive for rotating the front weeder rod includes a fixed bar attached to the machine frame and an angle shaft journaled in the rear portion of said fixed bar and coupled to the front weeder rod, and the drive for rotating the rear weeder rod includes an extension bar slidable lengthwise of and clamped to said fixed bar, a short bar secured to the rear end of said extension bar, and an angle shaft journaled in said short bar and coupled to the rear weeder rod.

CLAUDE C. CALKINS.
LAURENCE A. HUNT.